W. L. JENNINGS.
WAGON.
APPLICATION FILED FEB. 19, 1920.
1,384,720.
Patented July 12, 1921.
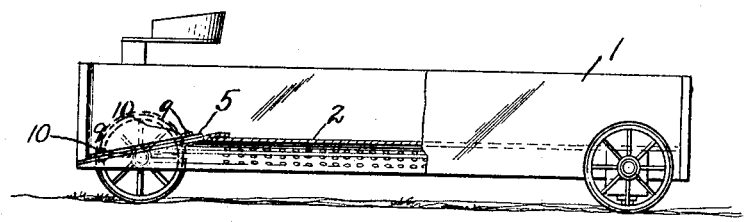
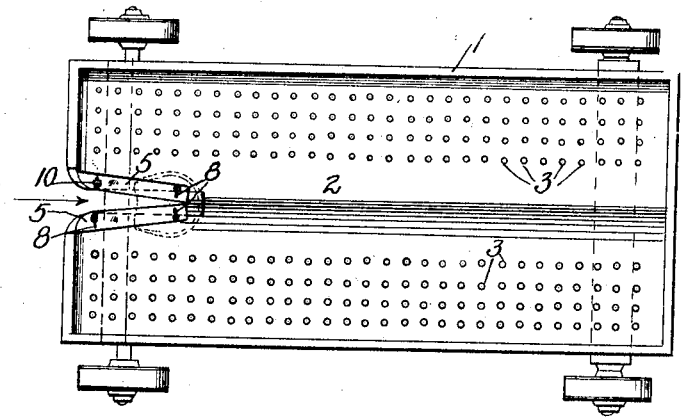
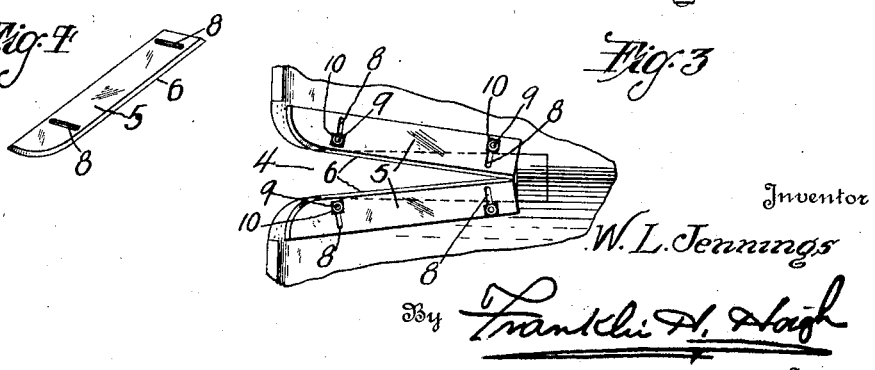
Inventor
W. L. Jennings
By Franklin H. Haigh
Attorney

UNITED STATES PATENT OFFICE.

WILLIAM L. JENNINGS, OF GIRARD, TEXAS.

WAGON.

1,384,720.   Specification of Letters Patent.   Patented July 12, 1921.

Application filed February 19, 1920. Serial No. 359,771.

*To all whom it may concern:*

Be it known that I, WILLIAM L. JENNINGS, a citizen of the United States, residing at Girard, in the county of Kent and State of Texas, have invented certain new and useful Improvements in Wagons; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a vehicle such as a wagon with means for automatically pulling cotton bolls.

In the accompanying drawing,—

Figure 1 is a view in side elevation, partly broken away, of a wagon equipped with my automatic cutting mechanism.

Fig. 2 is a view in top plan of such wagon.

Fig. 3 is a fragmentary view in top plan of that portion of the wagon carrying the cutting mechanism, and Fig. 4 is a detached detail view in perspective of one of the cutting knives or blades.

Referring now in detail to the drawing,—

1 designates a wagon having a bottom 2, which is preferably inclined downward from the longitudinal center thereof toward each side, as shown. Preferably, also, the wagon bottom 2 is provided with numerous apertures 3. Toward one end the wagon bottom 2 is provided with a downwardly extending slot 4.

Adjustably positioned along the sides of said slot 4 are cutting knives or blades 5, 5 each provided with a longitudinally extending cutting edge 6, and with a curved cutting edge 7 at the forward end of the blade. Each of said blades is provided toward each end with transversely extending slots 8, 8, through which bolts or other fastening means 9 may pass, nuts 10 being threaded on the ends of said bolts so as to clamp the blades in position. As shown in Figs. 2 and 3, I preferably adjust said blades so that they abut at their rear ends and thence incline away from each other so as to present therebetween a substantially V-shaped recess.

The operation of the device is obvious, it being apparent that as the wagon is moved along the cotton field the blades will pull the cotton bolls.

Having thus described my invention, what I claim and desire to secure by Letters Patent of the United States is:

A wagon body having a bottom oppositely inclined from a longitudinal median line, diverging blades having their adjacent rearward ends substantially flush with the higher median portion of the bottom, and their forward ends depressed substantially flush with the lower extreme edges of the bottom, said bottom being provided with a slot registering with the interval between the blades.

In testimony whereof I hereunto affix my signature.

WILLIAM L. JENNINGS.